United States Patent
Kawaguchi

(10) Patent No.: US 7,752,341 B2
(45) Date of Patent: *Jul. 6, 2010

(54) PROGRAMMABLE CONTROLLER AND COMMUNICATION UNIT THEREFOR

(75) Inventor: Shinichiro Kawaguchi, Ritto (JP)

(73) Assignee: OMRON Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/366,838

(22) Filed: Feb. 6, 2009

(65) Prior Publication Data

US 2009/0198844 A1    Aug. 6, 2009

Related U.S. Application Data

(62) Division of application No. 11/796,560, filed on Apr. 27, 2007, now Pat. No. 7,509,440.

(30) Foreign Application Priority Data

Apr. 28, 2006   (JP)   ............... 2006-124931

(51) Int. Cl.
*G06F 3/00* (2006.01)

(52) U.S. Cl. ............... 710/5; 710/36; 710/107; 711/129

(58) Field of Classification Search ............... None
See application file for complete search history.

(56) References Cited

U.S. PATENT DOCUMENTS

| | | | |
|---|---|---|---|
| 4,442,504 A | 4/1984 | Dummermuth et al. | |
| 4,742,443 A | 5/1988 | Rohn et al. | |
| 4,751,672 A | 6/1988 | Yamada | |
| 6,564,272 B1 | 5/2003 | Strongin et al. | |
| 6,662,247 B1 | 12/2003 | Ales et al. | |
| 7,307,998 B1 | 12/2007 | Wang et al. | |

FOREIGN PATENT DOCUMENTS

| | | |
|---|---|---|
| EP | 0311007 | 4/1989 |
| GB | 2038035 | 7/1980 |
| JP | 05-173986 | 7/1993 |

OTHER PUBLICATIONS

Sheu, Tsang-Ling, and Shieh, Yuan-Bao, "Experimental Analysis of Cache Memories for Interconnect Controllers", 1990 IEEE, pp. 188-194.

*Primary Examiner*—Eron J Sorrell
(74) *Attorney, Agent, or Firm*—Weaver Austin Villeneuve & Sampson LLP

(57) ABSTRACT

A programmable controller includes a CPU unit, a communication unit and peripheral units connected together through an internal bus. The communication unit has a bus master function, including a cache memory for recording IO data stored in the memory of an input-output unit. When a message is received, it is judged whether the IO data stored in the memory of the input-output unit specified by this message is updated or not. If the data are not updated, a response is created based on the IO data stored in the IO data stored in the cache memory. If the data are updated, the input-output unit is accessed and updated IO data are obtained and a response is created based on the obtained IO data.

9 Claims, 18 Drawing Sheets

PROGRAMMABLE CONTROLLER AND COMMUNICATION UNIT THEREFOR

This is a divisional of application Ser. No. 11/796,560 filed Apr. 27, 2007, currently pending.

BACKGROUND OF THE INVENTION

This invention relates to a programmable controller and a communication unit therefor.

Network systems for factory automation (FA) are comprised of one or more programmable controllers (PLC) for controlling production equipments and apparatus of which the operations are controlled by the PLC, connected together to a control system network. These PLC and apparatus serve to control the production equipments by exchanging IO data among them by carrying out communications cyclically through the control network.

The PLC is formed by combining a plurality of units such as a CPU unit for carrying out calculations based on a control program, an input unit connecting to input devices such as sensors and switches for taking in their on-off signals as input signals, an output unit connecting to output devices such as actuators and relays for transmitting output signals to them, a communication unit for exchanging data with other devices connected to the network, and a power unit for supplying electric power to each unit.

There are situations in FA where a plurality of control devices such as programmable controllers are connected to the network for carrying out a cooperative control among them. For carrying out such a cooperative control, data on the input-output devices connected to the programmable controllers may be exchanged mutually among them through the network. Methods of thus exchanging data among the programmable controllers include the data exchange method of the command-response type whereby one PLC transmits a request message to another PLC for exchanging data and the data of the PLC input-output unit are received as a response, as well as the so-called datalink method whereby each PLC carries out transmission and reception of I/O data periodically, based on information that is preliminarily set.

When programmable controllers connected to a network exchange data among them, this is carried out through the communication units which are each one of the constituent units of a programmable controller. Since each communication unit is provided only with the function of transmitting and receiving data, it cannot execute any process in either of these methods requiring an access to the memory of an input-output unit such as the I/O access process of datalink and the process of getting I/O data by message transmission. Since the access to such a memory can be executed by the CPU unit which is a bus master, it was necessary for the communication unit to transmit to the CPU unit a request for I/O access.

Thus, since the I/C access process is carried out by the CPU unit whenever I/O data are exchanged, for example, the load on the CPU unit becomes heavy in the case of a high-frequency data exchange, and this may seriously affect the control which is the principal function of the CPU unit. In the case of a data exchange method which must be carried out through the CPU unit for accessing a peripheral unit such as the input-output unit, therefore, the user could not accomplish both a high-speed control of a programmable controller and a high-speed and high-frequency data exchange on the network at the same time.

Japanese Patent Publications Tokkai 5-173985 and 5-173986 have disclosed a programmable controller provided with a plurality of CPU units so as to have a multi-bus master function, these CPU units being capable of independently accessing the individual input-output units. These inventions can be utilized to provide a communication unit with the function of accessing the I/O memory of the input-output unit such that the load on the CPU units is reduced.

In view of the demand for increasing the speed of data exchange cycle and the data volume, however, there is a problem of sudden increase in the bus traffic due to the bus access by the communication devices at the time of data exchange, and both communication units and CPU units are thereby affected. This problem cannot be answered only with communication units with the capability of directly accessing peripheral units without going through the CPU unit.

SUMMARY OF THE INVENTION

It is therefore an object of this invention to provide a programmable controller and a communication unit capable of responding in real time to a request for data exchange from another device connected to the network, reducing the traffic on the internal bus and reducing the effect on the control by the programmable controller.

A programmable controller according to this invention comprises a CPU unit, a communication unit and peripheral units connected together through an internal bus wherein the communication unit has a bus master function of obtaining an access right to the internal bus and releasing it. Since the bus master function is also possessed by the CPU unit, the programmable controller of this invention may be characterized as being provided with a multi-bus master function. The communication unit has a cache memory for recording IO data stored by the peripheral units, and the cache memory is divided into partitions corresponding to the peripheral units. Operations of update check and IO refresh of the cache memory are executed in units of these divided partitions. The communication unit also comprises update judging means for judging, when a message is received thereby, whether IO data stored in the peripheral unit specified by the message are updated or not, and responding means for creating response data based on the IO data stored in the peripheral unit stored in the cache memory, if the IO data are not updated, and accessing the peripheral unit by obtaining the access right to the internal bus, if the data are updated, to obtain the updated IO data and to create response data based on the obtained IO data.

According to a practical embodiment, the peripheral units may correspond to input-output units but may also correspond to control units or other units. A cache memory corresponding to memories of the CPU unit or the communication unit may also be provided. In the case of a programmable controller with a plurality of communication units, it is required only that at least one of these communication units be provided with the function described above.

A high-speed data exchange cycle can be realized by this invention because a response is returned based on IO data stored in a cache memory when a message is received if the content of the memory of the peripheral unit is not updated. It is also possible to reduce the bus traffic according to this invention since it is not required according to this invention to acquire the access right to the bus to access the memory of a peripheral unit and to obtain the IO data every time a message is received. The load on the CPU is also reduced because such data exchanges are effected by the communication unit.

Since the operations such as the IO refresh of the cache can be carried out by judging the access destination based on the destination information included in the message protocol and carrying out IO refresh or direct access only regarding the peripheral unit in question, the message transmitter may appear to be directly connected to the peripheral unit. Even if the message transmitter transmits messages for data exchange at random timings to different peripheral units, appropriate real-time characteristics can be assured corresponding to each response and a response can be made with a minimum amount of IO refresh.

The communication unit may comprise judging means for judging whether or not a preliminarily set effective period has passed since the IO data of the peripheral unit were stored in the cache memory and means for creating response data, when the communication unit has received a message, based on the IO data stored in the peripheral unit stored in the cache memory, if the judging means judges that the effective period has not passed since the IO data were stored, and accessing the peripheral unit by obtaining the access right to the internal bus, if the judging means judges that the effective period has not passed since the IO data were stored, to obtain the updated IO data and to create response data based on the obtained IO data.

If the effective period is set appropriately, the probability of making the IO data stored in the cache memory and the IO data stored in the memory of the actual peripheral data equal can be made as high as possible. Thus, the response data created based on the cache memory become as close to the real I/O data. The process becomes simplified, furthermore, since it is not necessary to check the presence or absence of updating every time a message is received.

The communication unit may preferably comprise means for carrying out IO refresh of cache memory based on the obtained IO data. Although the timing for IO refresh of cache memory can be set arbitrarily, needless IO refresh can be dispensed with if it is arranged in this manner to be carried out as a message is received and IO data are obtained. IO refresh will not be carried out frequently in situations where there are not many requests for data exchange and the bus traffic can thus be reduced.

It is also preferable that the programmable controller of this invention be operable in a mode in which a specified one of the peripheral units is accessed without judging whether or not IO data stored in the cache memory are used, IO data stored in the specified peripheral unit are obtained and a response is returned based on the obtained IO data.

The invention further relates to a communication unit for a programmable controller, having a bus master function of obtaining and releasing an access right to the internal bus of the programmable controller, the communication unit comprising a cache memory for recording IO data stored by the peripheral units, the cache memory being divided into partitions corresponding to the peripheral units, update check and IO refresh of the cache memory being executed in units of the divided partitions, update judging means for judging, when a message is received thereby, whether IO data stored in the peripheral unit specified by the message are updated or not, and responding means for creating response data based on the IO data stored in the peripheral unit stored in the cache memory if the IO data are not updated and accessing the peripheral unit by obtaining the access right to the internal bus, if the IO data are updated, to obtain the updated IO data and to create response data based on the obtained IO data.

According to this invention, a real-time response can be made to a request from another device connected to the network for exchanging data and the traffic on the internal bus can be reduced such that the effect on the control by the programmable control can be reduced.

DETAILED DESCRIPTION OF THE INVENTION

Figure 1:
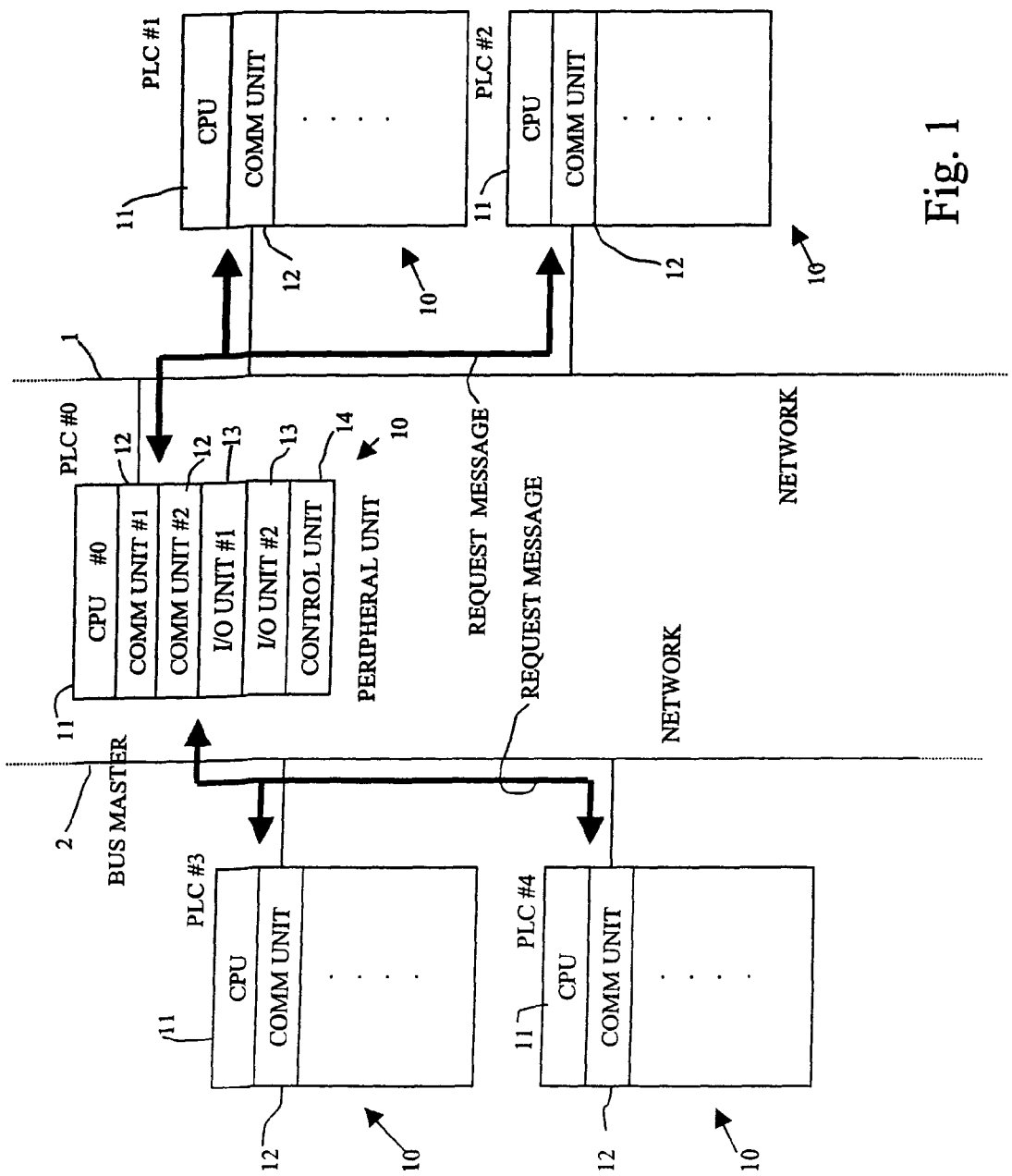
FIG. 1 shows an example of network system including a programmable controller of this invention.

FIG. 1 shows an example of network system including programmable controllers (PLC) of this invention. This network system is formed by connecting a personal computer, programmable controllers and other devices to a plurality of networks. For the convenience of disclosure, however, FIG. 1 shows only programmable controllers 10 connected to networks 1 and 2, three programmable controllers 10 (#0, #1 and #2) being connected to the first network 1 and three programmable controllers 10 (#0, #3 and #4) being connected to the second network 2. The numbers #n associated with the individual programmable controllers 10 are the node numbers of the programmable controllers on the networks.

The programmable controllers 10 are formed with units of different kinds such as a CPU unit 11 for carrying out a ladder program, a communication unit 12 for connecting to a network, an input-output unit 13 and a control unit 14. The input-output unit 13 may be a basic I/O unit or an advanced I/O unit. The control unit 14 may be a motion controller unit or a high function unit of another kind. The programmable controller may be formed by mounting each of these units at specified slots on a back plane. Each of the mounted units becomes connected to an internal bus inside the back plane as it is mounted to its slot such that data communications become possible among the units through the bus.

Each programmable controller 10 is connected to a network through the communication unit 12. Data are exchanged among the programmable controllers 10 on a network through messages. Request messages may be transmitted at a constant period preliminarily determined by the communication unit itself or they may be transmitted like events at the timing of message transmission described in a program.

According to the present embodiment, the CPU unit 11 and the communication unit 12 serve as a bus master and secure a "bus right", becoming capable of accessing the memories of the other units which become peripheral units. If the PLC 10 (#0) connected to the two networks 1 and 2 is considered as an example, it is provided with one CPU unit 11 (#0), two communication units 12 (#1 and #2), two input-output units 13 (#1 and #2) and one control unit 14. Although not shown in the drawing, it also includes power units.

Figure 3:
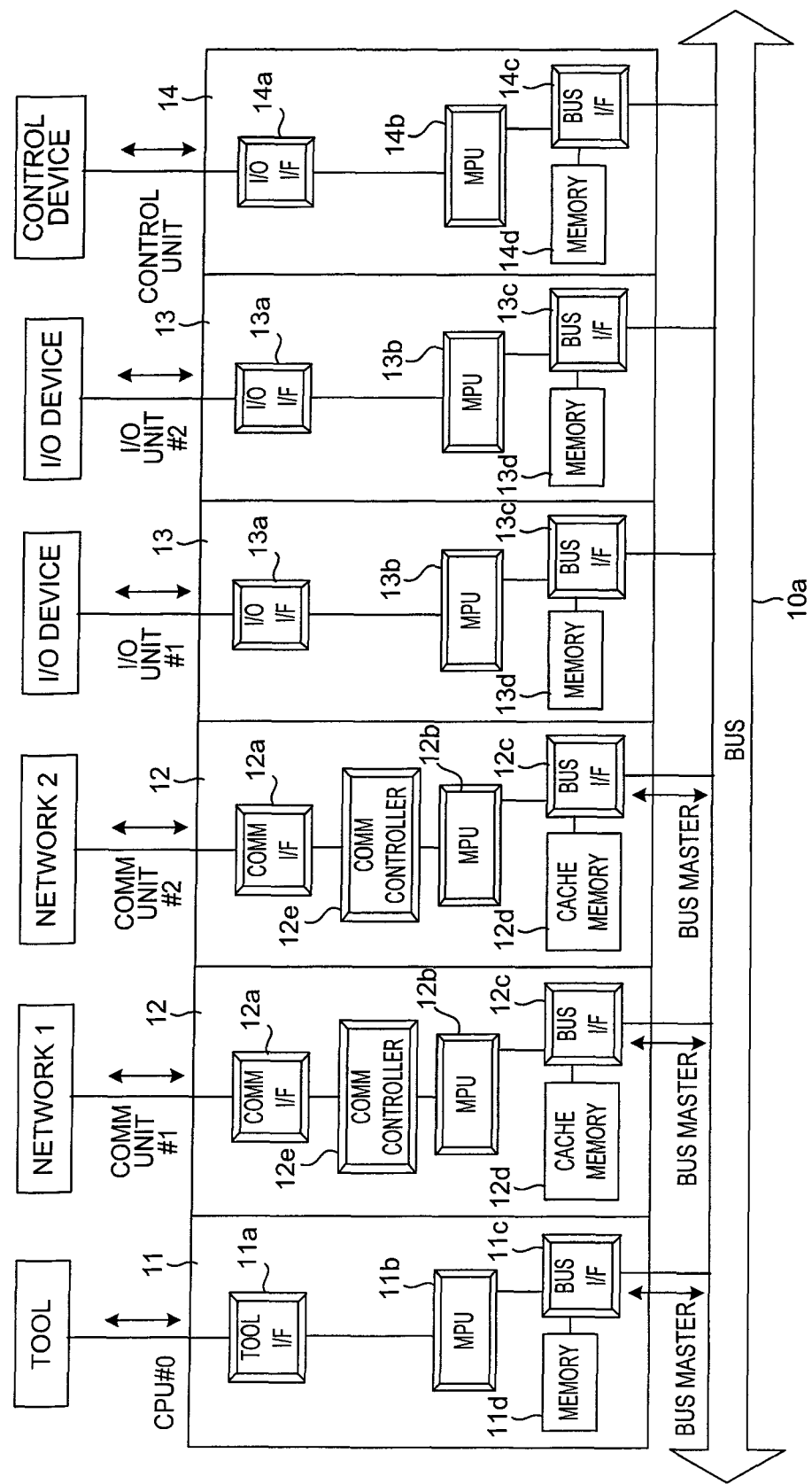
FIG. 3 is a block diagram for showing the internal structure of each unit of programmable controller #0.

FIG. 3 shows the internal structure (hardware block) of each unit of this PLC 10 (#0). The CPU unit 11 is provided with a tool interface 11a for connecting to a tool device, an MPU 11b for carrying out the calculation execution of a user program or the like downloaded from a tool device through this tool interface 11a, a memory 11d which may be used as a work memory when the MPU 11b executes a calculation and also serves to store IO data of other units and a bus interface 11c for connecting to an internal bus of the PLC (such as PLC bus and back plane bus) to carry out data communications with other units. The bus interface 11c may be formed with an ASIC. The basic functions of each of these processing parts are the same as those of prior art components.

The communication unit 12 is provided with a communication interface 12a, an MPU 12b, a bus interface 12c and a cache memory 12d. The communication interface 12a is connected to the networks 1 and 2 and serves to exchange data with the networks 1 and 2. A communication controller 12e follows a command from the MPU 12b to generate messages addressed to other programmable controllers connected to the networks 1 and 2 and to transmit them through the communication interface 12a. It also serves to analyze messages obtained through the communication interface 12a and to carry out a specified reception process.

The MPU 12b serves to obtain necessary data based on a data request message received from the communication controller 12e, to generate a response and to return it to the communication controller 12e, and to generate a transmission message periodically or in response to a transmission request from the CPU unit 11 and to transmit it to the communication controller 12e.

The bus interface 12c is connected to the internal bus 10a of the PLC and serves to carry out data communications with other units. The bus interface 12c may be formed with an ASIC. The basic functions of each of these processing parts of the communication unit 12 are the same as those of prior art components.

Figure 4:
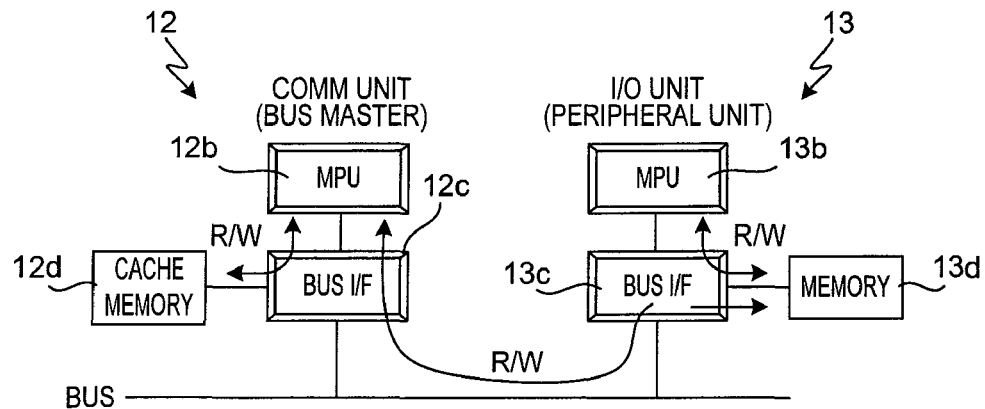
FIG. 4 shows the memory access of each MPU.

According to this embodiment of the invention, the communication unit 12 is provided with a bus master function. Thus, as shown in FIG. 4, the MPU 12b can exchange data not only with its cache memory 12d through the bus interface 12c but also with the memory 13d of another peripheral unit (such as the input-output unit 13) by accessing it through the internal bus 10a. Since a bus master can access not only a peripheral unit but also the memory of another bus master directly through the bus interface, the MPU 12b can access the memory 11d of the CPU unit 11 or the cache memory 12d of another communication unit 12 and exchange data with them.

If a plurality of units are thus provided with a bus master function and compete for the access to the internal bus 10a of these bus masters, an arbitration process is carried out by the bus interfaces. The arbitration may be carried out such that the processes are executed in the order in which the requests for access are made. Alternatively, degrees of priority may be preliminarily set for the bus masters such that the access from the bus master with the highest priority is carried out.

The input-output unit 13 is provided with an IO interface 13a, an MPU 13b, a bus interface 13c and a memory 13d. The IO interface 13a serves to exchange data with I/O devices that are connected. If it is an input device that is connected, the IO interface 13a will transmit the IO data from this input device to the MPU 13b. If it is an output device that is connected, the IO interface 13a follows an instruction from the MPU 13b to output IO data to this output device. The MPU 13b accesses the memory 13d through the bus interface 13c to read and write IO data and exchanges data with I/O devices through the interface 13a.

The control unit 14 is similarly provided with an IO interface 14a, an MPU 14b, a bus interface 14c and a memory 14d. The IO interface 14a serves to exchange data with the connected control device. The MPU 14b accesses the memory 14d through the bus interface 14c to read and write data IO data and controls the operations of the control device.

The input-output unit 13 and the control unit 14 cannot access the memory of other units because they are not provided with the bus master function. The basic functions of each of their processing parts are the same as those of the corresponding prior art parts.

Figure 2:
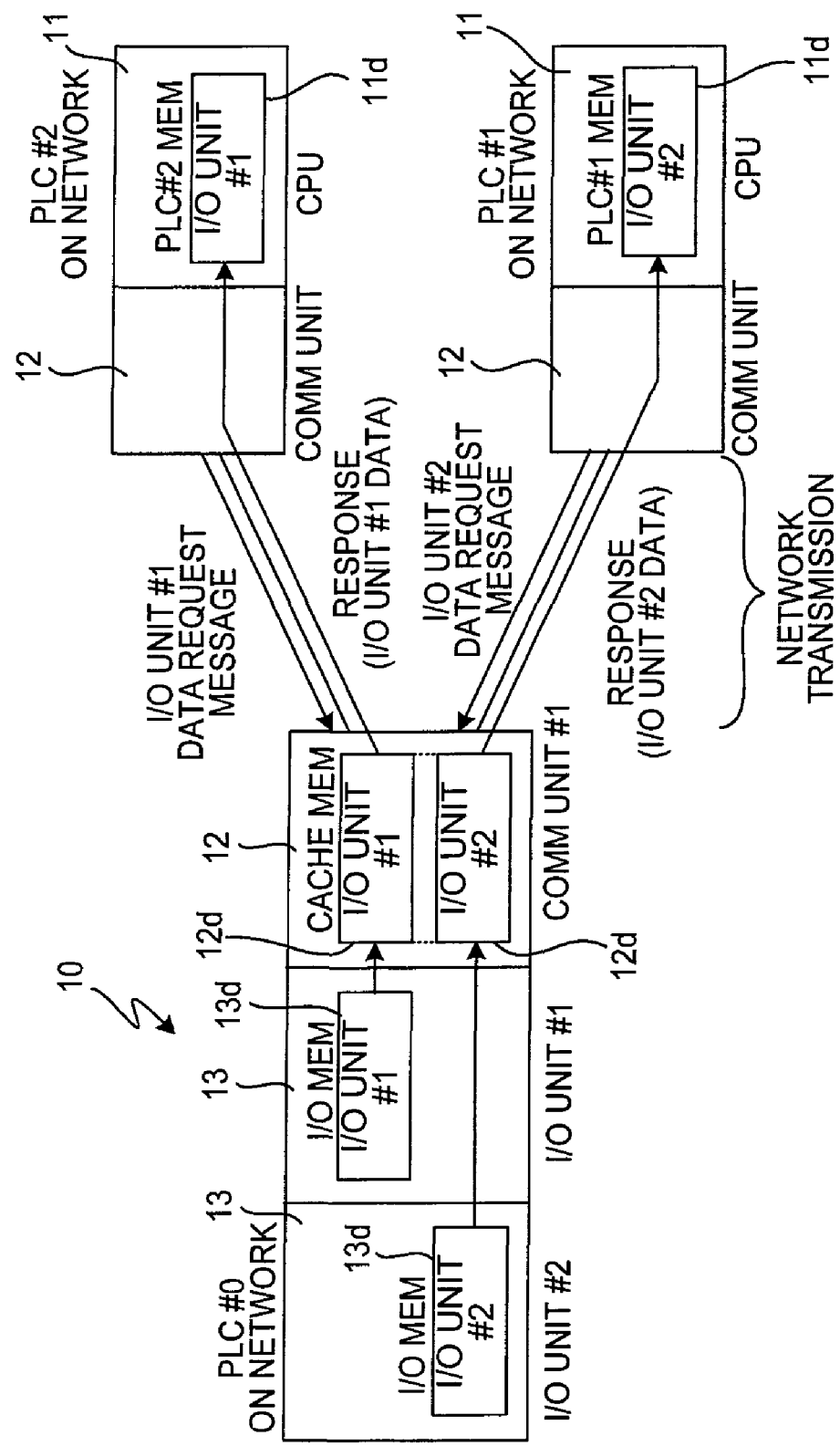
FIG. 2 shows an example of data exchange.

Since the communication unit 12 according to this invention is provided with the bus master function, it preliminarily accesses the memory 13d of another unit (such as the input-output unit 13) to read out IO data stored in its memory 13d and also to store the read out IO data in its own cache memory 12d, as shown in FIG. 2.

Thus, as a data request message for the IO data of the input-output unit 13 (#1 or #2) is issued to PLC 10 (#0) from another PLC (#1 or #2), the communication unit 12 which received this message, reads out the IO data preliminarily stored in its own cache memory 12d and returns a response. Thus, there is no need to access the memory of the input-output unit every time a data request message is received. This means that the bus traffic on the internal bus 10a can be reduced and a high-speed data exchange can be effected.

Figure 5:
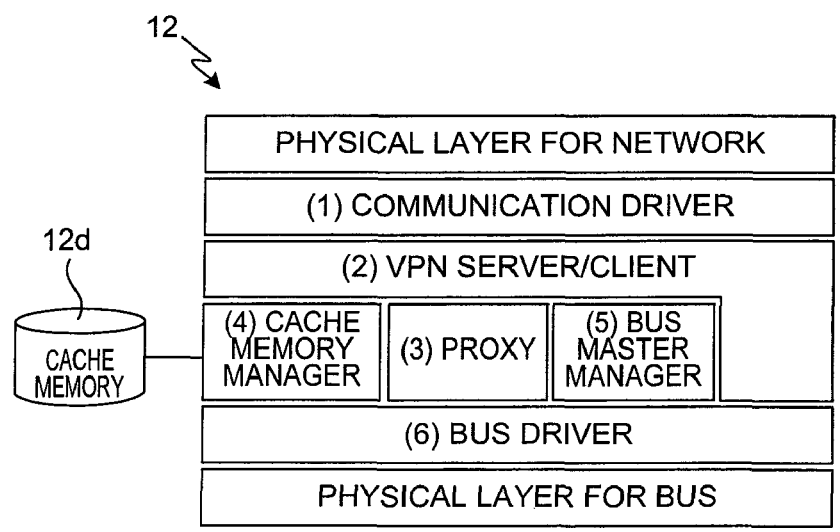
FIG. 5 is a software function diagram of the communication unit.

FIG. 5 is a correlation diagram of software functions of the communication unit 12 serving as a bus master. The physical layer for network corresponds to the communication interface 12a and the physical layer for bus corresponds to the bus interface 12c. The communication driver (1) is a driver for communicating with the exterior and transmits and receives request messages made into a form of capsules by each communication protocol of the network layers.

The VPN server/client (2) carries out analyses of controls of addressed destinations (addressees) of transmitted and received messages. In other words, messages received by the communication interface 12a are analyzed to obtain the addressee unit ID and it is communicated to the proxy (3). The address to which the response to the received message is also obtained and managed. At the time of transmission of data, a transmission message is created from the addressee unit ID.

The proxy (3) controls the IO refresh of the cache memory 12d. When a data request message from another PLC is received through the VPN server/client (2), it is determined whether the requested data are the newest stored in the cache memory 12d and if the requested data are the newest, the data stored in the cache memory 12d are obtained. If not, the memory of the actual unit storing the requested data is accessed and a response is returned. The algorithm for this determination will be described below.

The cache memory manager (4) serves to manage the physical addresses of the cache memory corresponding to the unit ID and its data. Cache data are transmitted and received according to requests from the proxy (3).

The bus master manager (5) serves to manage the physical addresses of the bus corresponding to the unit ID. The physical addresses that are managed include the address of update register and the addresses of I/O memory areas.

The bus driver (6) is a driver for the bus access and serves to read and write data through the internal bus 10a by obtaining its access right and to release this obtained right after its process is finished.

Figure 6:
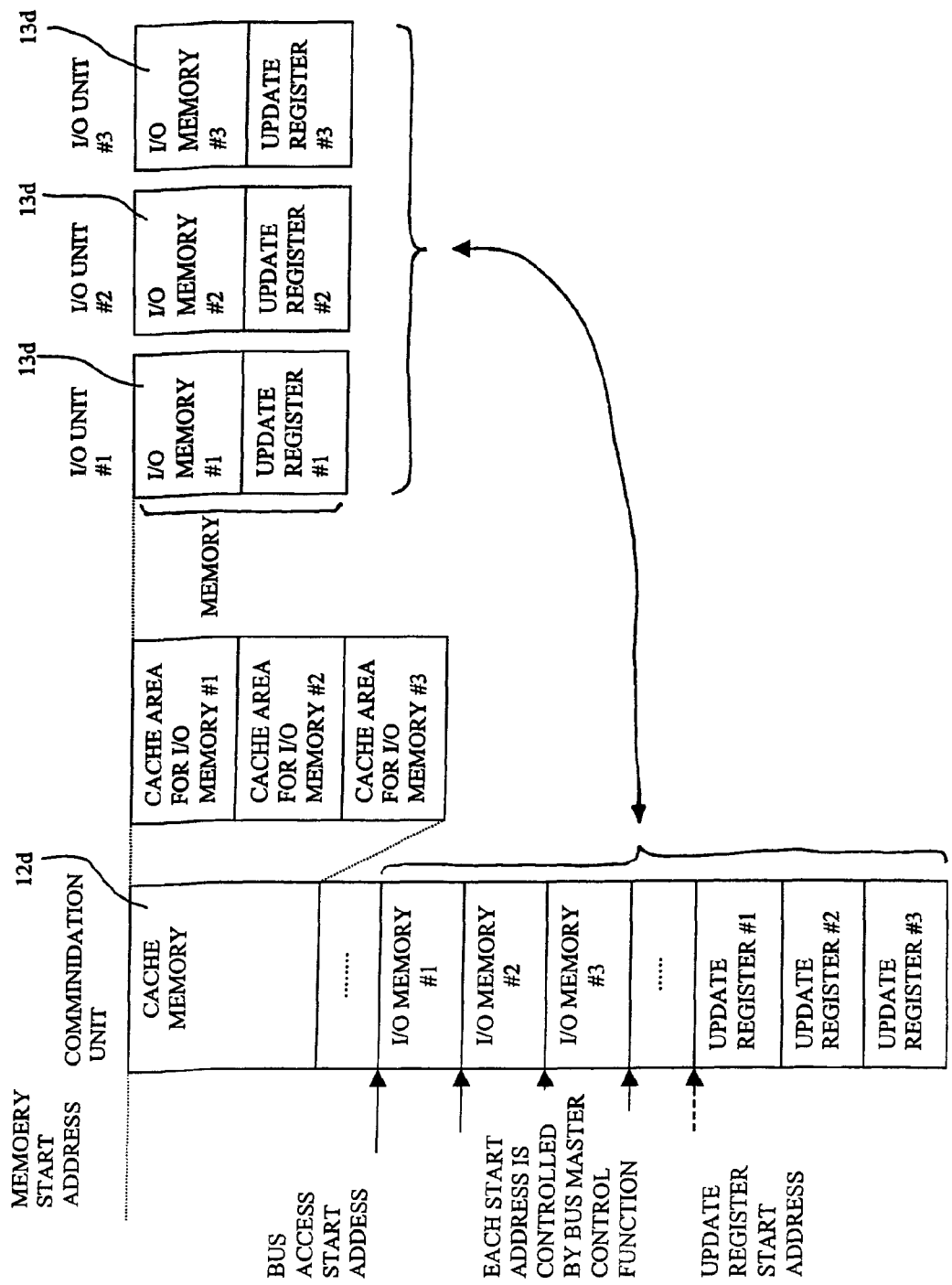
FIG. 6 shows an example of how a memory appears from the MPU of each unit.

Next, the method of assigning the memory map and the memory is explained. FIG. 6 shows how a memory appears from the MPU 12b of a bus master (communication unit 12) and from the MPU 13b of a peripheral unit (input-output unit 13). Although PLC 10 (#0) was shown as having two input-output units 13, an example with three input-output units 13 (#1, #2 and #3) is shown in this figure.

Since the input-output units 13 are not bus masters, their MPUs 13b can see the data (I/O memory #n) stored in their own memories 13d and the update register #n indicating the presence or absence of updating of these IO data but cannot see the data stored in the memories of the other units.

Since each communication unit 12 is a bus master, its MPU 12b can see not only the data stored in its own cache memory 12d (cache data of IO data of each input-output unit) but also the data (IO data and update register) stored in the memory 13d of each of the other units (input-output units 13).

The memory of a peripheral unit is mapped on the bus. This is to say that the assignment of the I/O memory of each unit is uniquely set in the order of the unit numbers and the update registers of the units are uniquely assigned sequentially in the order of the slot positions. Specifically, the setting is carried out as follows: (I/O memory assignment)=(Start address)+ (unit number)*(memory capacity of one unit) and (update register assignment)=(start address)+(slot number)*(capacity of update register). In the above, the start address for the assignment of I/O memory mapped on the bus is the start address of the bus access area and the start address for the assignment of update register is the start address of the update register.

According to the illustrated embodiment, the assignment method for the I/O memory mapped on the bus and that for each I/O memory of the cache memory 12d are the same. This is to say that when a certain IO data item is read or written, if the data start address is set at the start address of the bus access area, the corresponding IO data item can be read or written by accessing the actual memory 13d of the input-output unit 13 and that if the start address is set at the memory start address of the cache memory, the corresponding IO data item can be read or written by accessing the cache memory 12d.

Figure 7:
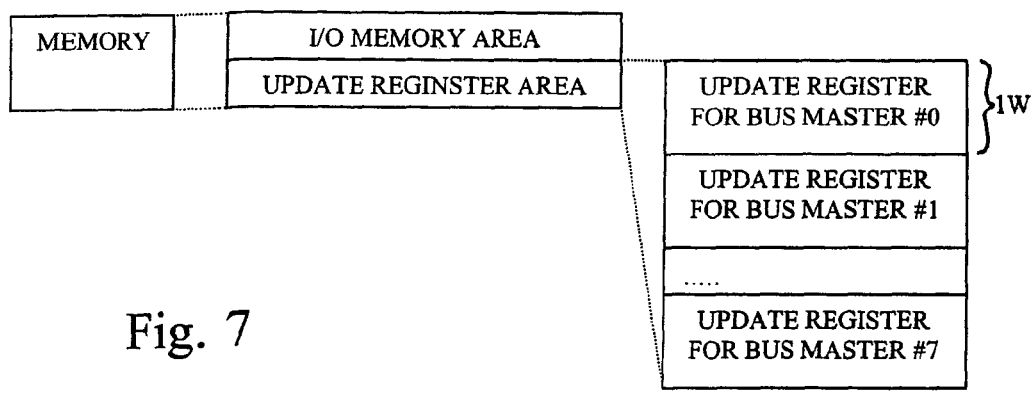
FIG. 7 shows an example of the data structure of the memory of a peripheral unit (input-output unit).
Figure 8:
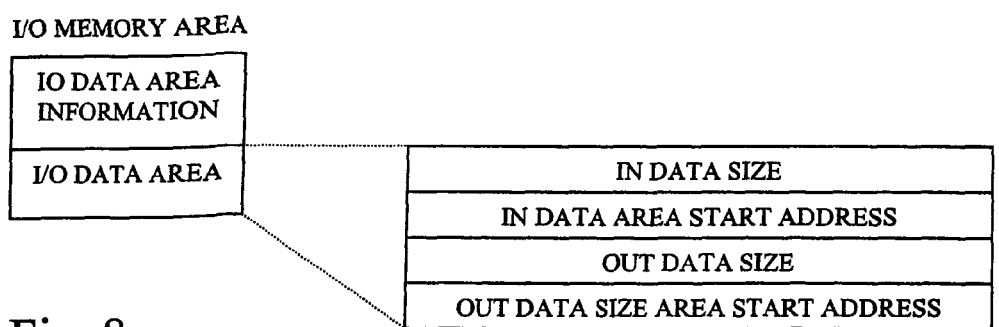
FIG. 8 shows an example of the data structure of the I/O memory area.

FIGS. 7 and 8 show a memory map of the memory 13d of a peripheral unit (input-output unit 13). As shown in FIG. 7, the memory 13d may be divided into an I/O memory area and an update register area. The I/O memory area is for storing the IO data of real I/O devices. The update register area is comprised of update registers dedicated to each of the bus master units. The update registers serve to store information indicating whether the IO data stored in the I/O memory area have been updated or not. The update register to be used by the bus master unit when accessing a peripheral unit is uniquely determined from the slot position of the bus master unit. If at most eight bus masters are to be set, for example, eight registers are assigned as update register for bus master #0, update register for bus master #1 . . . , update register for bus master #7, as shown in FIG. 7, in the order of the slot numbers. In the example of FIG. 7, bus master units mounted to slot numbers #n are used as update registers for bus master #n.

The data size of each update register is 1 W. The bus mater update register uses 2 bits out of the data of 1 W as meaningful data. When a bus master or a peripheral unit wishes to update a data item of the memory of a peripheral unit, the corresponding bit becomes "1".

When the MPU within a bus master updates the memory of a peripheral unit through the bus, it writes "1" in the update bit on the side of the bus master of the update register for itself in that peripheral unit. When the peripheral unit thereby comes to know that the update bit on the side of the bus master has become "1" and the I/O memory area has been updated and the peripheral unit has obtained the data, "0" is written at the corresponding bit of the peripheral unit.

Similarly, when the MPU within a peripheral unit updates the memory of that peripheral unit, it writes "1" in the update bit on the side of the peripheral unit of all update registers for the bus master. When the bus master has obtained the data, the bus master writes "0" at the update bit on the side of the peripheral unit of the update register for itself. There are the following four conditions shown in Table 1 from the combinations "0/1" of the update bit on the side of the bus master and the update bit on the side of the peripheral unit for the update register for the bus master.

TABLE 1

| | Update bit on bus master side | Update bit on peripheral unit side | Meaning |
| --- | --- | --- | --- |
| Condition 1 | 0 | 0 | No data update on the side of either bus master or peripheral unit |
| Condition 2 | 1 | 0 | Data update on the side of bus master |
| Condition 3 | 0 | 1 | Data update on the side of peripheral unit |
| Condition 4 | 1 | 1 | Data update on the side of both bus master and peripheral unit |

As shown in FIG. 8, the I/O memory area is provided both with "I/O data area" for storing I/O data and with "IO data area information" for determining the addresses of the data in this I/O data area. This IO data area information is stored at the start of the IO memory area with four areas set for "IN data size", "IN data area start address", "OUT data size" and "OUT data area start address". The bus master uses this IO data area information to obtain IN data and output OUT data. The IO data area information is defined for each peripheral unit and is set by the peripheral unit at the time of initial setting.

Figure 9:
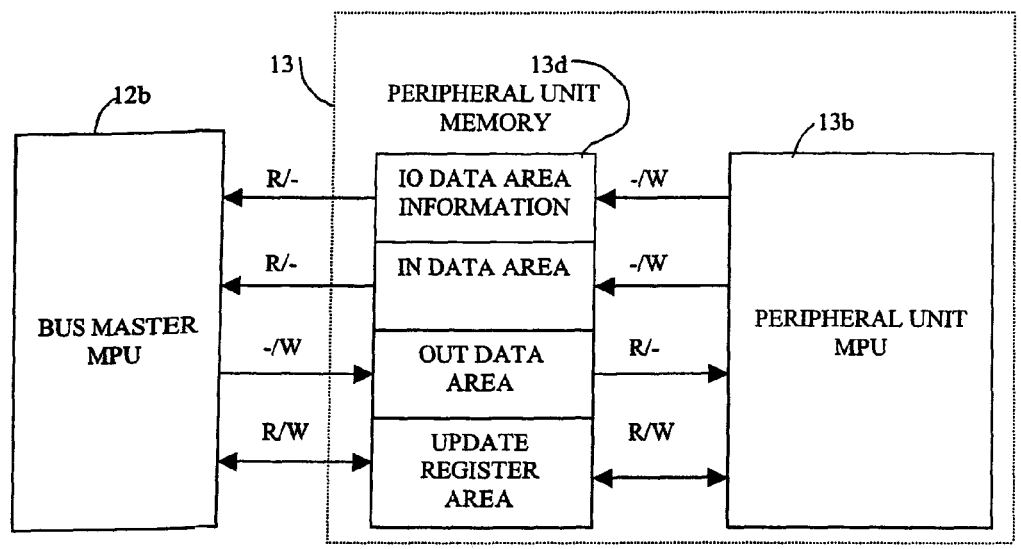
FIG. 9 shows the access by the MPUs of a bus master and a peripheral unit to the memory of a peripheral unit (input-output unit).

FIG. 9 shows the directions in which the MPU 12b of a bus master (communication unit 12) and the MPU 13b of a peripheral unit (input-output unit 13) access the memory 13d of this peripheral unit (input-output unit 13). As for the "IO data area information", it is the MPU 13b of the input-output unit 13 which is a peripheral unit that writes it in and it is the MPU 12b of the communication unit 12 which is a bus master that reads it out. As for the "IN data area", it is the MPU 13b of the input-output unit 13 that writes it in and it is the MPU 12b of the communication unit 12 that reads it out. As for the "OUT data area", it is the MPU 12b of the communication unit 12 that writes it in and it is the MPU 13b of the input-output unit 13 that reads it out. As for the "update register area", it is both the MPU 12b of the communication unit 12 and the MPU 13b of the input-output unit 13 that both reads it out and writes it in.

The operation for this writing in the "update register area" is carried out as follows. When the OUT data area of a peripheral unit (input-output unit 13) has been updated from a bus master (communication unit 12), the MPU 12b writes "1" (ON) at the update bit on the side of the bus master for all registers in the update register area. When the bus master obtains data from the IN data area, the MPU 12b reads in only the corresponding update register. When the bus master has obtained the update data of the IN data area, the MPU 12b writes in "0" (OFF) only at the update bit on the side of peripheral unit of the corresponding update register.

Figure 16:
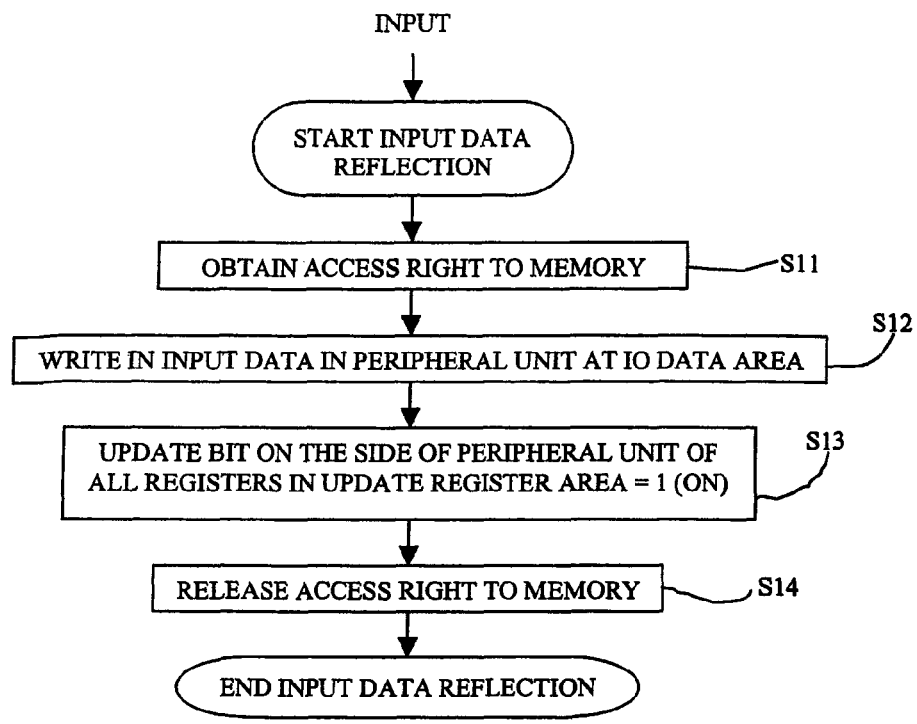
FIG. 16 is a flowchart of the process of reflecting input data.

When the input-output unit 13 updates the IN data area, the MPU 13b writes in "1" (ON) at the update bit on the side of the peripheral unit for all registers in the update register area. Practically, as shown in the flowchart of FIG. 16, the MPU 13b writes in the input data (Step S12) and the update bit on the side of the peripheral unit (Step S13) after the access right to the memory is obtained (Step S11) and thereafter the access right to the memory is released (Step S14).

Figure 17:
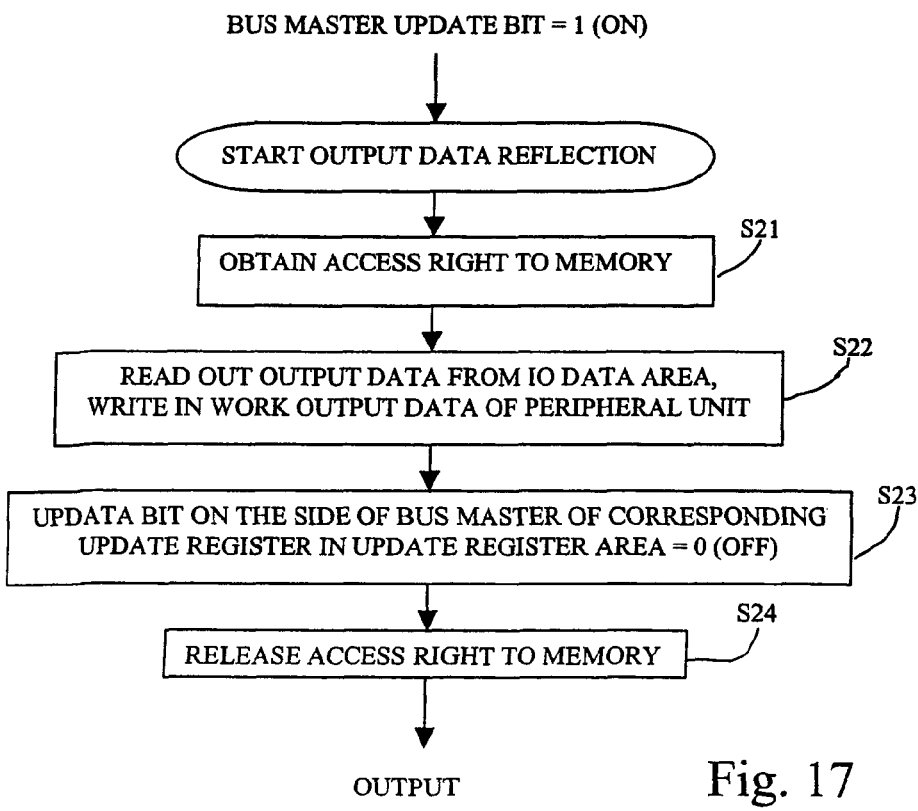
FIG. 17 is a flowchart of the process of reflecting output data.

When the input-output unit 13 obtains data of the OUT area, the MPU 13b reads in only the corresponding update register. When the input-output unit 13 has obtained the update data of the OUT area, the MPU 13b writes in "0" (OFF) at the update bit on the side of the bus master of the corresponding update register. Practically, as shown in the flowchart of FIG. 17, the MPU 13b obtains the output data (Step S22) and writes in at the update bit on the side of the bus master (Step S23) after the access right to the memory is obtained (Step S21) and thereafter releases the access right to the memory (Step S24).

In this way, the MPU of the bus master can judge whether the cache data stored in the cache memory 12d are the newest data (having the same contents as the data stored in the memory of the input-output unit) by checking the update bit on the side of the bus master.

Figure 10:
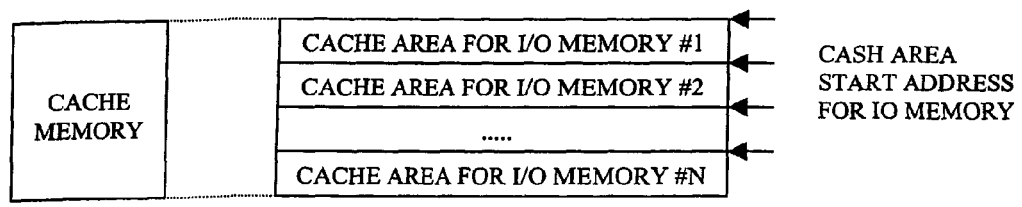
FIG. 10 shows an example of the data structure of the cache memory.

FIG. 10 shows the memory map of the cache memory 12d. As shown, cache memory areas for the I/O memory are assigned in the order of the unit numbers of the peripheral units. Thus, the area for caching the I/O data of each peripheral unit by the MPU 12b of the bus master is uniquely determined from the unit number of the corresponding peripheral unit. The start address of the cache area for the I/O memory is unitarily managed by the cache memory managing function. Specifically, the address is obtained by the formula: (I/O memory assignment)=(start address)+(unit number)* (memory capacity of 1 unit).

Next, the function of each unit is explained while specific routines for message transmission is described. There are two types of message transmission, transmission by the CPU unit 11 generating a request message and transmission by the communication unit 12 generating request messages at a fixed frequency.

Figure 11:
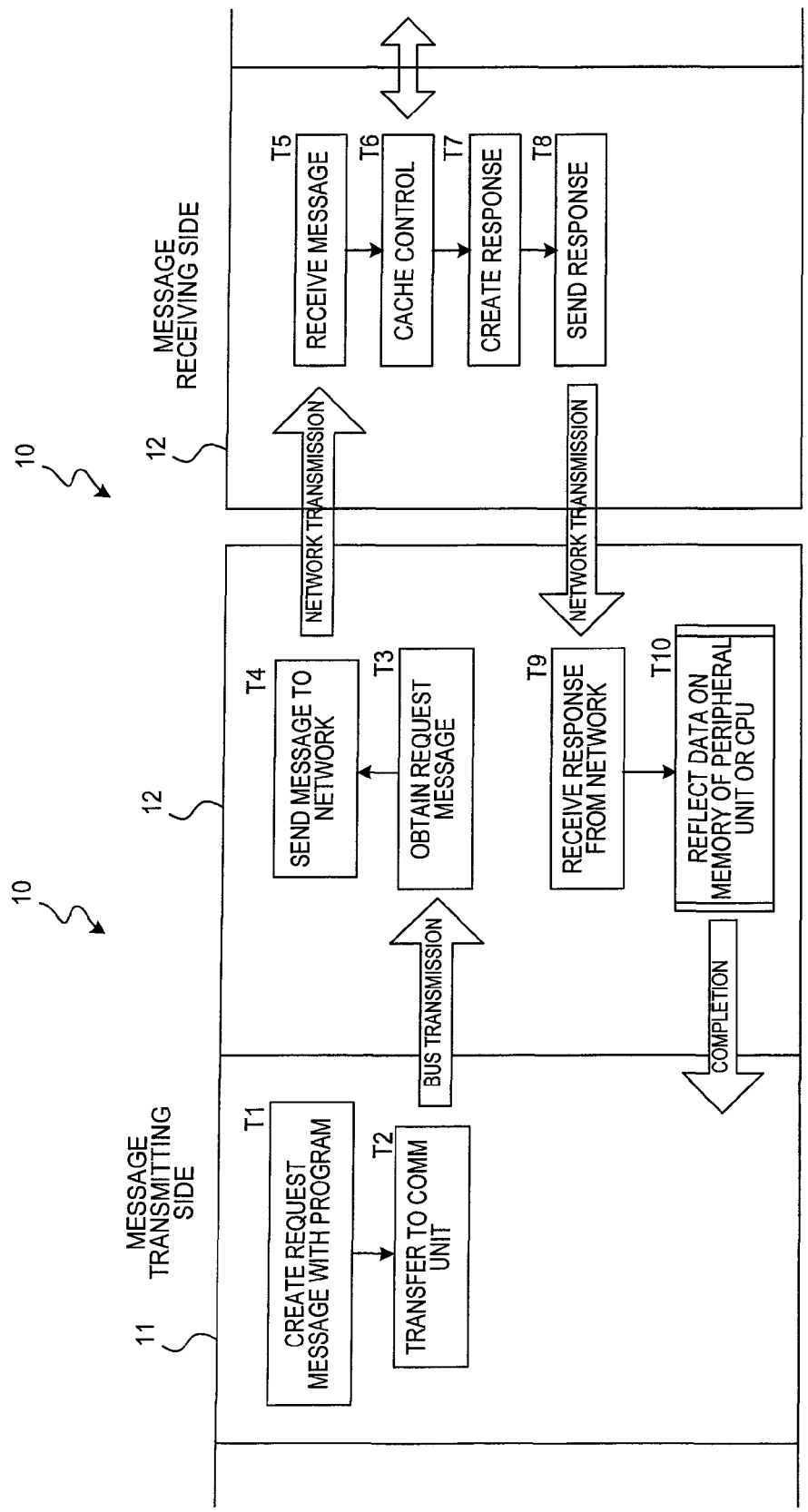
FIG. 11 is an operation flow for explaining message transmission.

FIG. 11 shows the operation flow when the CPU unit 11 carries out message transmission. The CPU unit 11 of the message transmitting PLC 10 generates a request message (T1) while carrying out the execution of the user program and transmits this message to the communication unit 12 (T2). As the request message from the CPU unit 11 is received (T3), the communication unit 12 transmits this request message to the network (T4). These steps from T1 to T4 are basically the same as in a prior art system.

As the message is received by the communication unit 12, the message receiving PLC 10 (T5) carries out the cache control (T6) and generates a response (T7). More specifically, the MPU 12b of the communication unit 12 judges whether or not the current cache data stored in the cache memory 12d can be utilized and creates a response based on the cache data if they are utilizable. If they are not utilizable, the memory of another unit specified through the internal bus is accessed to obtain data, the obtained data are stored in the cache memory and a response is created based on the content of the updated cache memory. Next, the MPU 12b transmits the created response (T8). The process by the message receiving PLC is described more in detail below.

The communication unit 12 of the message transmitting PLC 10 waits for the return of a response through the network. If a response is received (T9), the communication unit 12 analyzes the received response, and the data are reflected in the memory of a peripheral unit or the CPU unit. A completion message is then transmitted to the CPU unit 11 through the internal bus 10a (T10).

Figure 12:
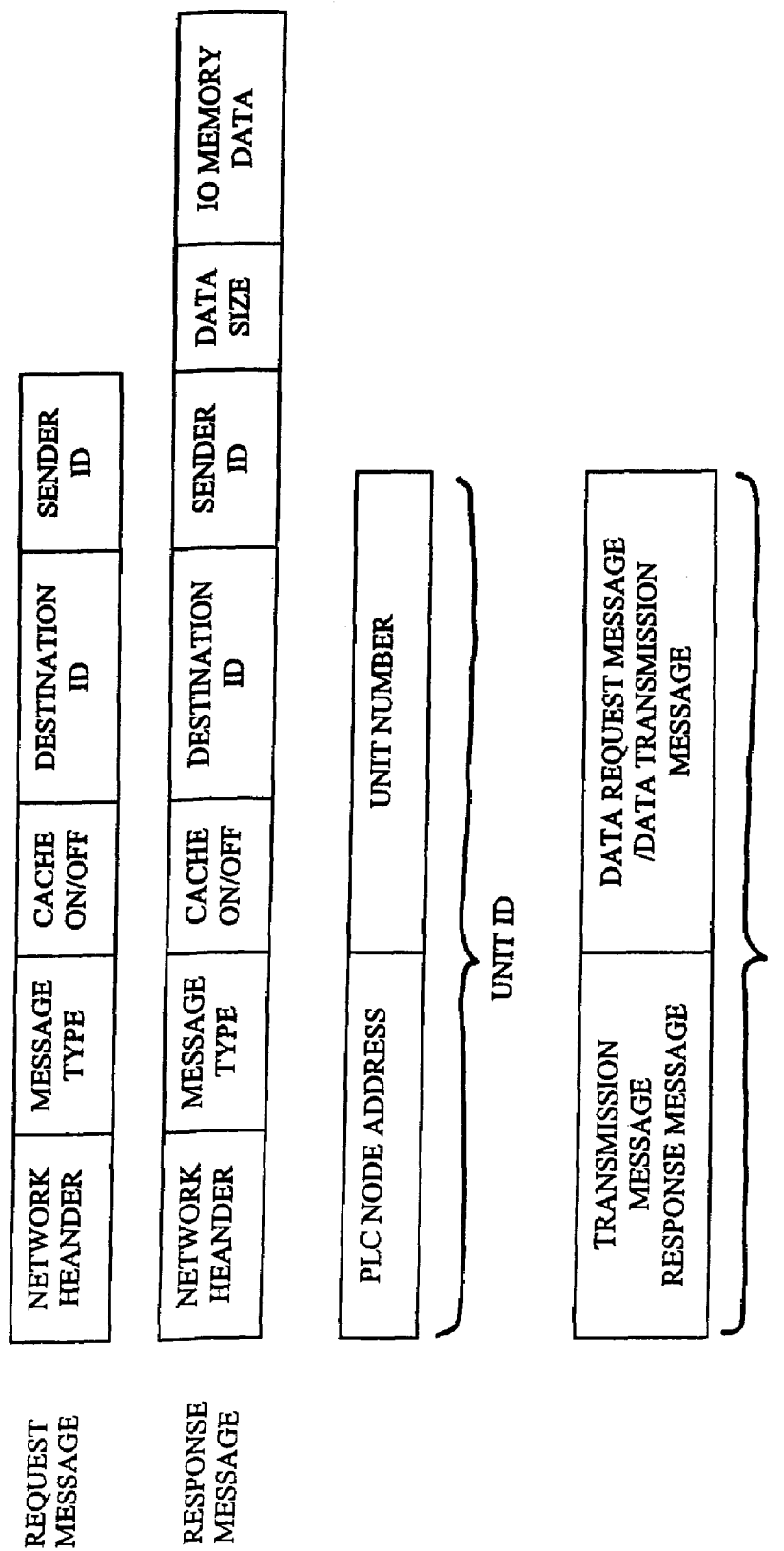
FIG. 12 shows an example of the data structure of a message.

FIG. 12 shows the data structure of the request message referred to above and the response message corresponding to it. The request message is provided with a network header, a message type, a cache ON/OFF, an addressee ID and a sender ID.

The network header is a header regulated by the communication protocol corresponding to each network and is generated by the communication controller. The message type shows whether it is a request message or a response message, and also whether the content of the request is a data-read request or a data-write request. The cache ON/OFF indicates the method of cache access at another PLC connected to the network. If this is OFF, the receiving side reads the IO memory data stored in the memory and returns a response. According to the software functional diagram of FIG. 5, data are exchanged by the route through the "communication driver VPN server/client-bus driver", not through the proxy. The addressee ID and the sender ID are both represented by "node address of PLC+unit number". The node address of a PLC is a number assigned uniquely to the PLC and any PLC on the network can be uniquely identified by this number.

Unit numbers are uniquely assigned to the individual units comprising each PLC and may be assigned also to memory areas of the PLC. In other words, each of the CPU units, communication units and peripheral units on the network has a unique ID (unit ID).

Figure 13:
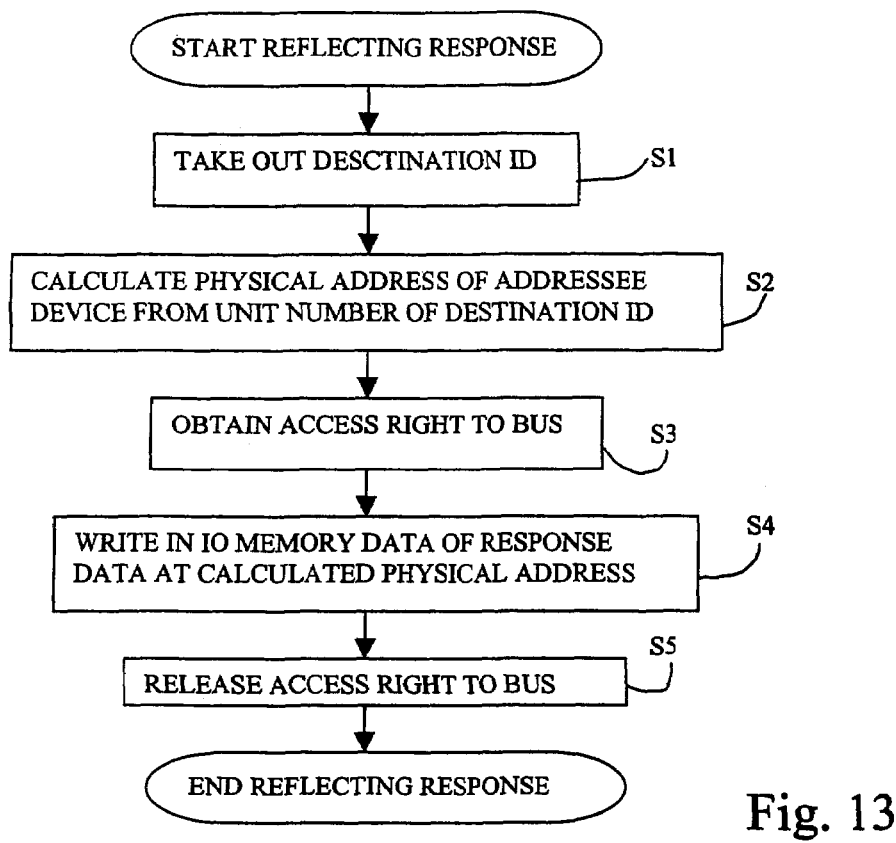
FIG. 13 is a flowchart of the process of reflecting a received response.

The data reflection process (T10) of FIG. 11 is carried out specifically by executing the flowchart shown in FIG. 13. Firstly according to this flowchart, an addressee ID is taken out of the received response (Step S1). The addressee ID comprises a combination of the node address of the PLC and the unit number of the corresponding unit.

Next, the MPU 12b calculates the physical address of the addressee unit from the unit number of the addressee ID (Step S2) and the access right to the internal bus is obtained (Step S3). The IO memory data of the obtained response data are written in at the calculated physical address (Step S4). In this manner, the data requested by the request message are written into the desired memory. Thereafter, the MPU 12b releases the obtained access right to the internal bus (Step S5) and the data reflection process is completed.

Figure 15:
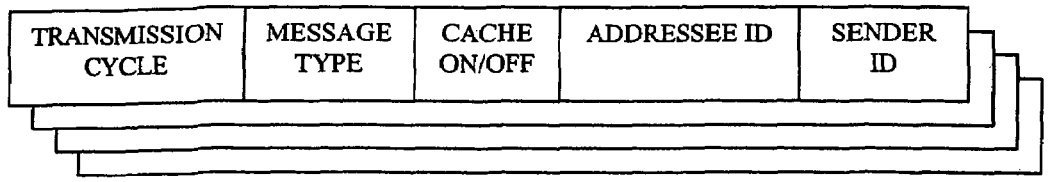
FIG. 15 shows an example of cyclic reception control information.
Figure 14:
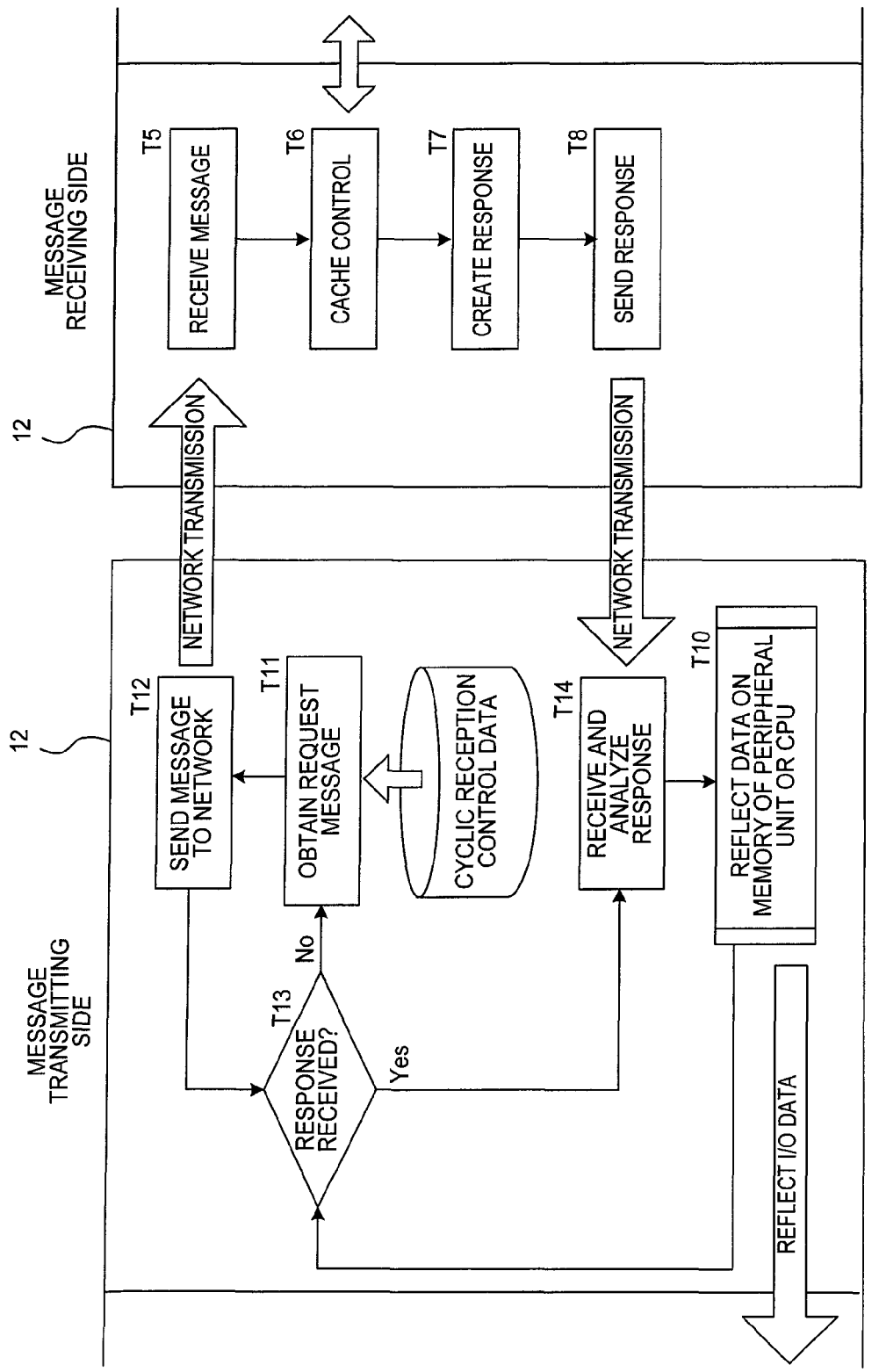
FIG. 14 is an operation flow for explaining the message transmission and reception.

FIG. 14 shows the operational flow when the communication unit 12 transmits request messages periodically at a fixed period. The request messages that are thus transmitted at a fixed period are recorded and stored at a specified memory area as cyclic reception control data, as shown in FIG. 15. When a transmission period arrives, the MPU 12b obtains a request message thus recorded and stored (T11) and transmits this obtained message to the network (T12). The cyclic reception control data may be set to the communication unit from a tool device.

The PLC 10 on the side of receiving the message executes a cache control (T6) as its communication unit 12 receives a message (T5), creates a response (T7) and transmits the created response (T8).

The communication unit 12 of the PLC 10 on the message transmitting side waits for the return of a response (T13) after the transmission of request message (T12) is completed (such as the reception of ACK). Since a reception flag is switched on by the communication controller operating independently of the MPU 12b, the judgment on the presence or absence of the reception may be effected by checking whether this reception flag is ON or OFF. If there is no longer any response which has not been processed when the response to the transmitted request has been processed (NO in T13), the process for the transmission of the next request message is carried out for the next period (T11).

When the reception flag is switched ON (YES in T13), the MPU 12b of the communication unit 12 not only receives the response but also analyzes the received response (T14). The data are reflected in the memory of the peripheral unit or the CPU unit and the completion of this process is communicated to the CPU unit through the internal bus.

Next, the operations on the message receiving side are explained with reference to FIGS. 18-20 which are flowcharts for explaining the functions of the communication unit receiving a message for requesting data. FIG. 21 explains these flowcharts on the protocol level.

As a message is received, the communication driver removes the unnecessary portions of the data in the message such as the network header and delivers it to the VPN server/client (Step S31). The VPN server/client obtains the unit number from the addressee ID in the message delivered from the communication driver and obtains the physical address of the bus and the physical cache address (Step S32). The cache mode (ON/OFF) is also obtained (Step S33) and the content of this mode is confirmed (Step S34).

Figure 18:
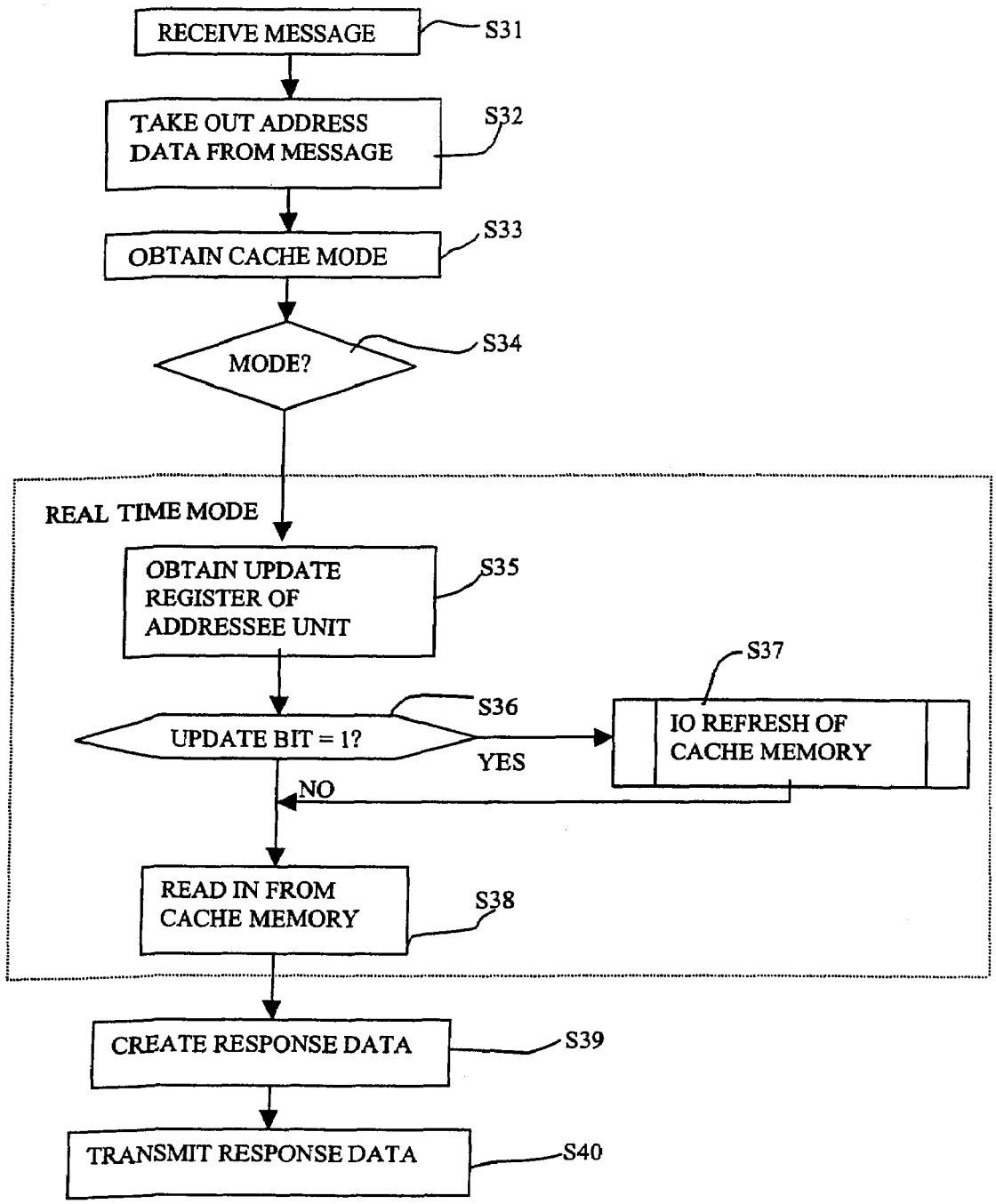
FIGS. 18-20 are flowcharts for explaining the functions on the message receiving side.

If the mode is "cache ON", the proxy executes the real time mode as shown in FIG. 18 by obtaining the update register of the addressee unit (Step S35) and checks whether or not the update bit on the side of the peripheral unit of the update register is "1" (Step S36). If the bit is "0" (NO in Step S36), since the data stored in the memory of the addressee unit and the data stored in the cache memory 12d corresponding to it are the same, the proxy reads out the data from the cache memory 12d. If the bit is "1" (YES in Step S36), IO refresh is carried out on the cache memory of the addressee unit (Step S37). In other words, the proxy delivers the physical cache address and the physical bus address to the I/O driver and the I/O driver reads in the corresponding data from the I/O memory on the bus according to the obtained address and writes it in the cache memory. Thus, the content of the cache memory after the IO refresh becomes the same as that of the memory of the real device. Thereafter, the proxy reads out the data from the cache memory 12d (Step S38) and delivers the data that have been read out to the VPN server/client.

The VPN server/client creates response data based on the data delivered from the proxy and delivers them to the communication driver (Step S39). The communication driver transmits the received response data to the network (Step S40).

In summary, in the case of this example, it is confirmed whether or not the peripheral unit data are updated or not by checking the value of the update register and if the data are not updated, the data in the cache memory are used as the response. If the data are updated, on the other hand, IO refresh of the cache memory is carried out.

The message reception process of Step S31 corresponds to T5 in FIGS. 11 and 14. Similarly, Steps S39 and S40 respectively correspond to T7 and T8. The series of processes from S32 to S38 corresponds to the cache control of T6.

Figure 19:
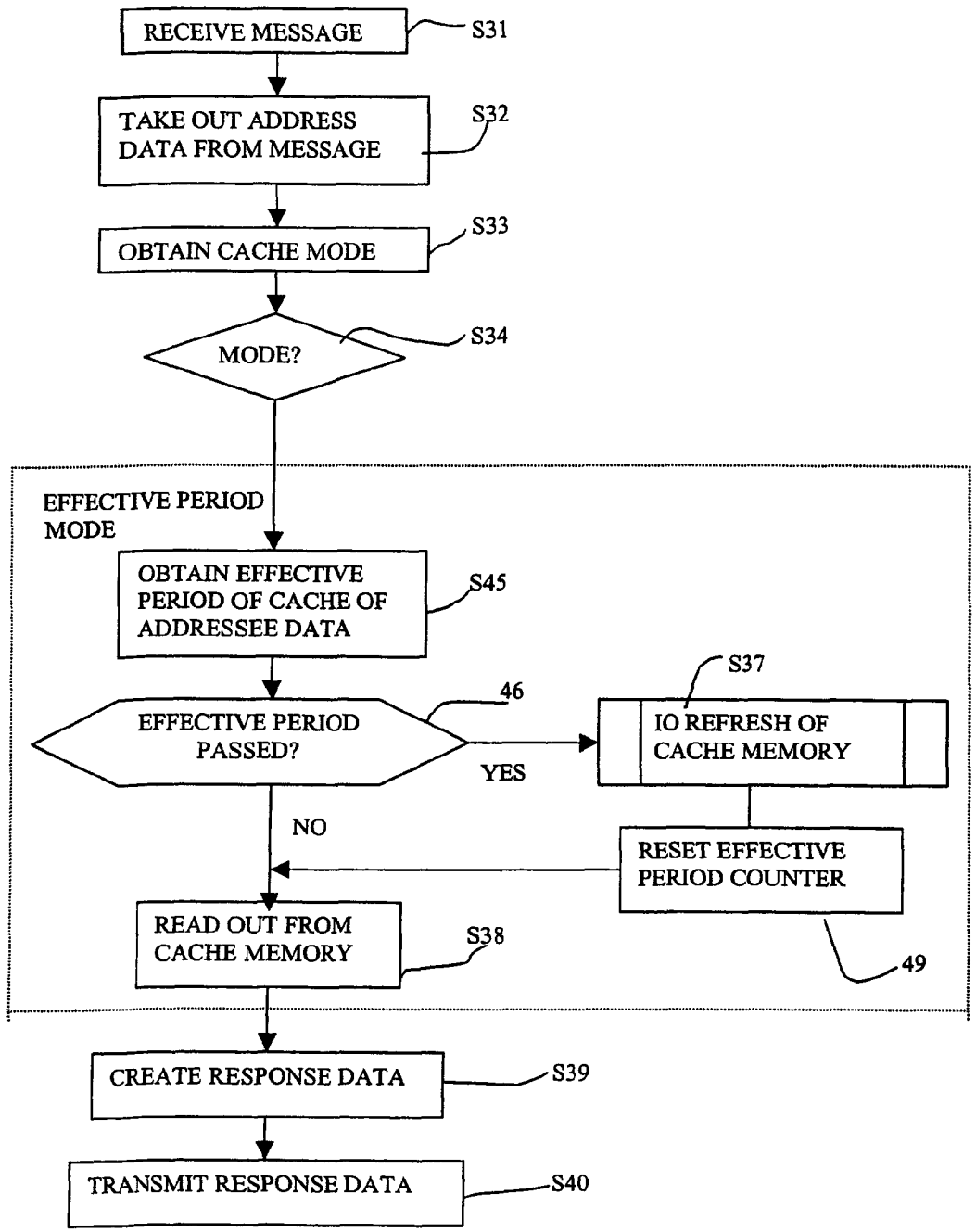

FIG. 19 is another example of the cache control. In this example, the judgment whether the response is made with the data in the cache memory or after the IO refresh of the cache memory when IO data are transmitted as response is made according to the effective period set for each I/O memory area of each cache memory. In other words, the proxy obtains the effective period of the addressee cache (Step S45), determines whether the cache data of the object IO memory area have passed the effective period or not (Step S46) and, if the effective period has been passed (YES in Step S46), carries out IO refresh of the cache memory (Step S37) and thereafter resets the count of the effective period (Step S49). The proxy then reads out the data from the cache memory either before the effective period is passed or after the IO refresh (Step S38). The data thus read out are delivered by the proxy to the VPN server/client. The effective periods may be set for each IO memory (each unit) of the cache memory.

The VPN server/client creates response data based on the data delivered from the proxy and delivers them to the communication driver (Step S39). The communication driver transmits the received response data to the network (Step S40).

Figure 20:
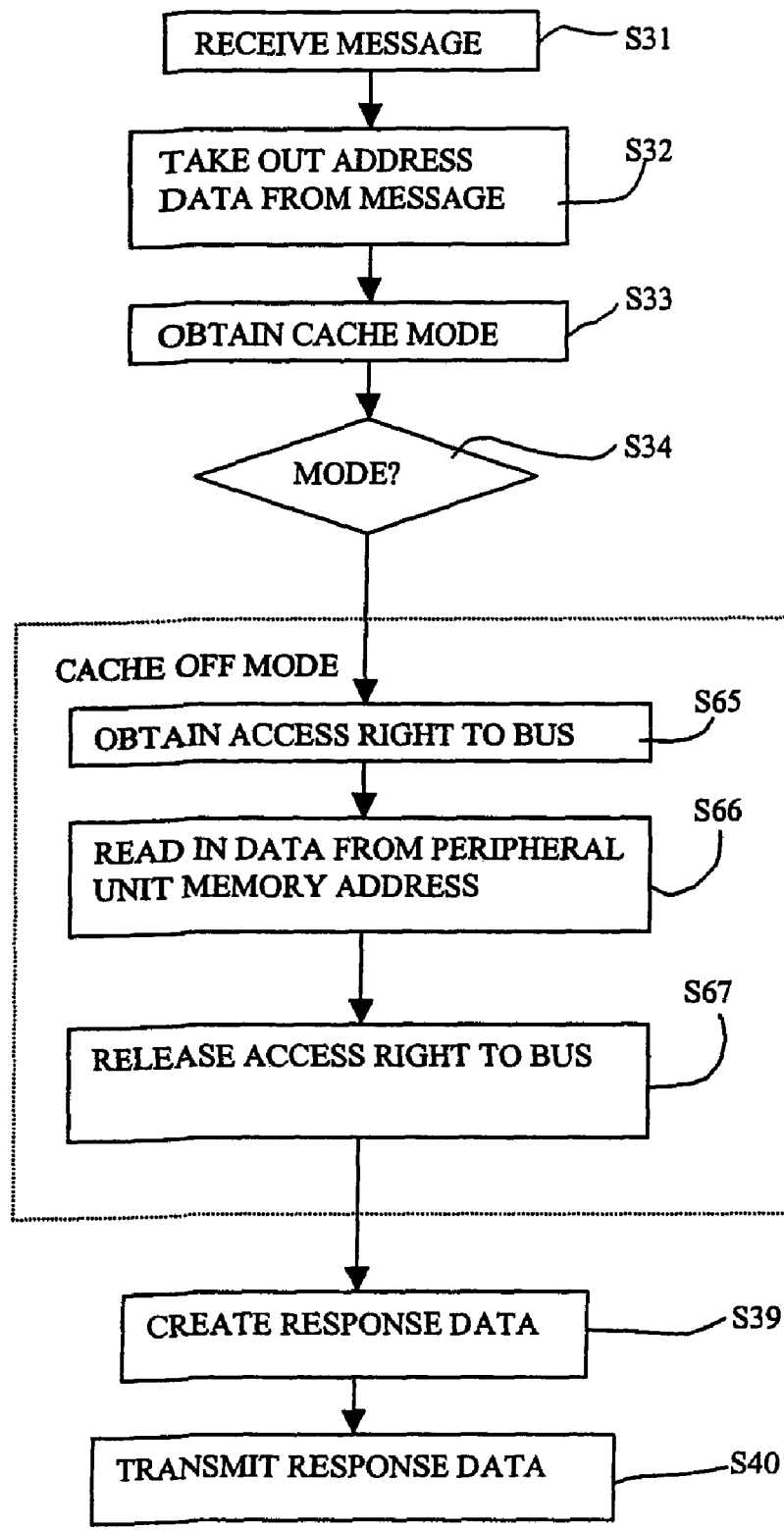
Figure 21:
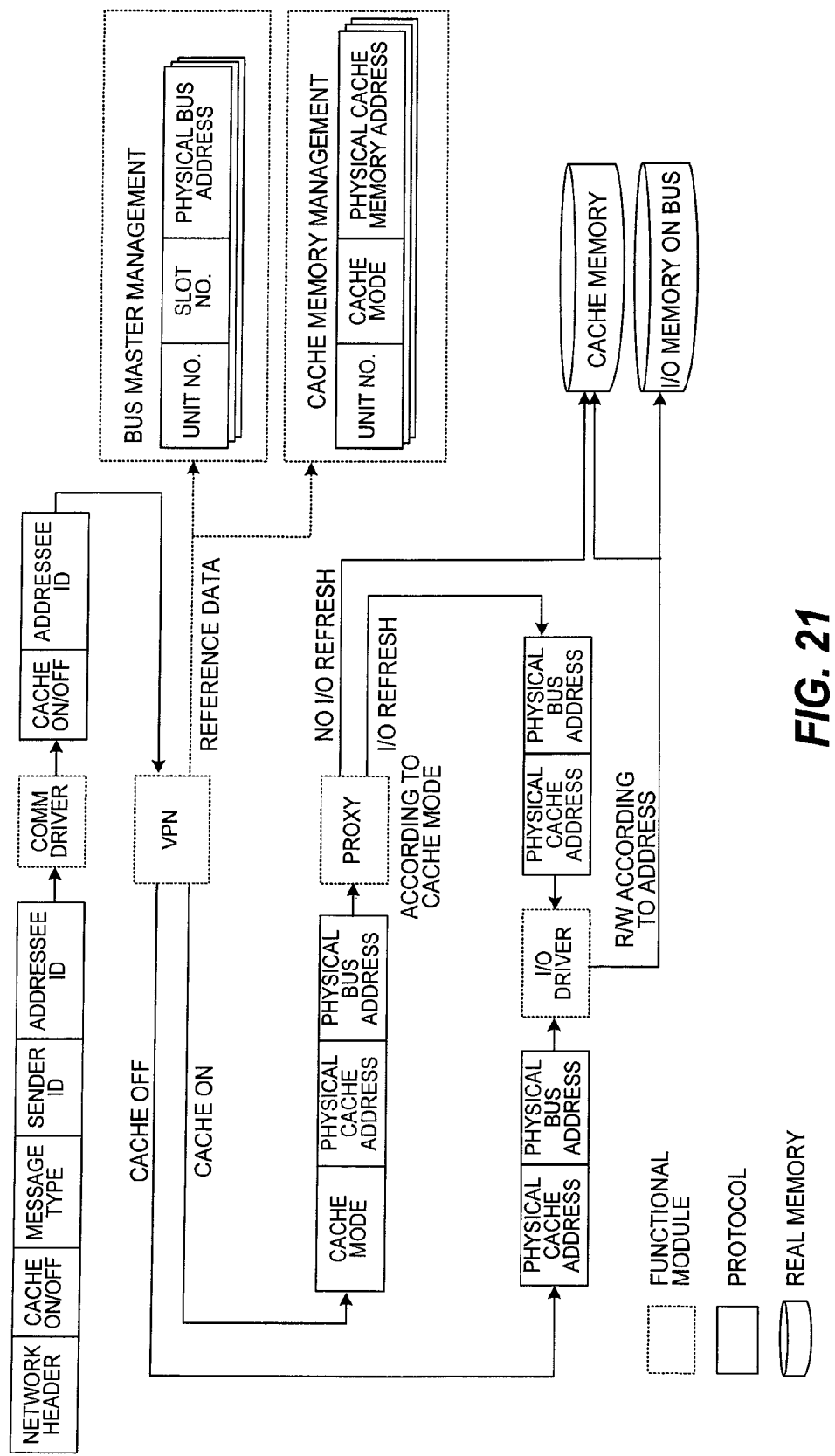
FIG. 21 is a diagram for explaining the processes on the message receiving side.

The flowchart shown in FIG. 20 is carried out if the mode is cache OFF in Step S34. The access right to the bus is obtained by returning a response based on the data stored at the memory address of a real peripheral unit (Step S65) and after the peripheral unit is accessed and the data are read out of the memory address of this peripheral unit (Step S66), the access right to the bus is released (Step S67). The other steps are the same as described above.

Figure 22:
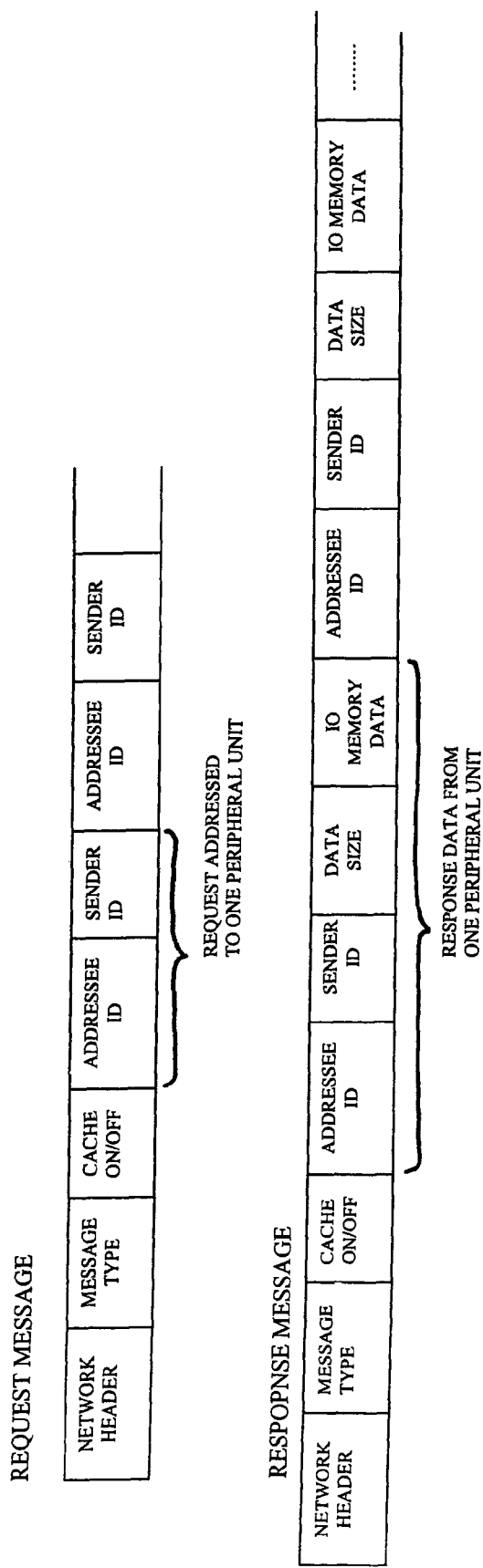
FIG. 22 shows another example of the data structure of message.
Figure 23:
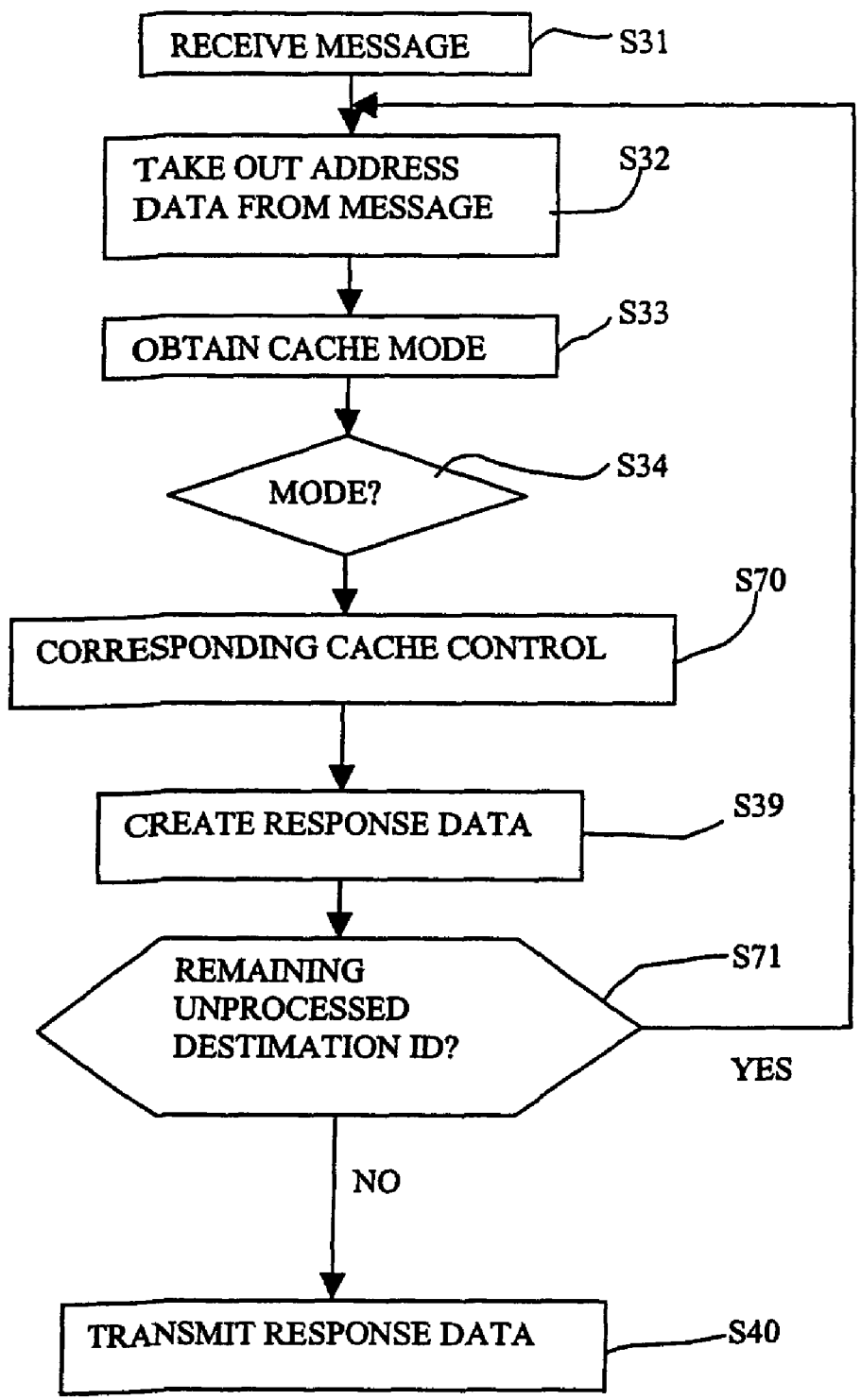
FIG. 23 is a flowchart for explaining the functions on the message receiving side according to another embodiment of the invention.

FIGS. 22 and 23 show essential portions of another embodiment of this invention. According to this embodiment of the invention, a plurality of peripheral units may be specified as addressees of one request message. In order to make it possible, the request message is designed as shown in FIG. 22 so as to store a plurality of pairs of addressee ID and sender ID. Accordingly, a plurality of groups of addressee ID, sender ID, data size and IO memory data (for each unit) are stored for each of response messages.

The communication unit on the transmission side according to this embodiment of the invention has the function of executing the flowchart shown in FIG. 23. Steps from S31 to S34 are the same as explained above. According to the condition in Step S34 (cache ON/OFF), a specified cache control process is carried out (Step S70), that is, the processes of Steps S35-S38 of FIG. 18, Steps S45, S46, S37, S49 and S38 of FIG. 19 or Steps S65-S67 of FIG. 20 are carried out.

Thereafter, the VPN server/client creates response data (Step S39), determines whether or not there remains any addressee ID not processed yet (Step S71) and, if any unprocessed addressee ID remains, returns to Step S32 to take out the next addressee ID and to carry out the series of processes in Steps S33, S34, S70 and S39. In Step S39 in this situation, every time data are created, the created data are connected to the end of the response data (addressee ID, sender ID, data size and I/O memory data) that have thus far been created.

After response data for all address IDs specified in the request message have been created, the communication driver transmits the created response data (Step S40).

What is claimed is:

1. A programmable controller comprising a CPU unit, a communication unit and peripheral units connected together through an internal bus; wherein
said communication unit comprises:
a cache memory for recording IO data stored in said peripheral units, said cache memory being divided into partitions corresponding to said peripheral units, update check and IO refresh of said cache memory being executed in units of said divided partitions;
period judging means for judging whether or not a preliminarily set effective period has passed since the IO data of said peripheral unit were stored in said cache memory; and
responding means serving to create response data, when said communication unit has received a message, based on the IO data stored in said peripheral unit stored in said cache memory, if said period judging means judges that said effective period has not passed since said IO data were stored, and to access said peripheral unit, if said period judging means judges that said effective period has passed since said IO data were stored, to obtain said updated IO data and to create response data based on said obtained IO data.

2. The programmable controller of claim 1 wherein said communication unit further comprises a bus master function of obtaining an access right to said internal bus and releasing said access right, and wherein said responding means serves to access said peripheral unit by obtaining the access right to said internal bus.

3. The programmable controller of claim 1 wherein said communication unit comprises means for carrying out IO refresh of cache memory based on said obtained IO data.

4. The programmable controller of claim 2 wherein said communication unit comprises means for carrying out IO refresh of cache memory based on said obtained IO data.

5. The programmable controller of claim 1 wherein said responding means is operable in a mode in which a specified one of said peripheral units is accessed without judging whether or not IO data stored in said cache memory are used, IO data stored in said specified peripheral unit are obtained and a response is returned based on said obtained IO data.

6. The programmable controller of claim 2 wherein said responding means is operable in a mode in which a specified one of said peripheral units is accessed without judging whether or not IO data stored in said cache memory are used, IO data stored in said specified peripheral unit are obtained and a response is returned based on said obtained IO data.

7. The programmable controller of claim 3 wherein said responding means is operable in a mode in which a specified one of said peripheral units is accessed without judging whether or not IO data stored in said cache memory are used, IO data stored in said specified peripheral unit are obtained and a response is returned based on said obtained IO data.

8. The programmable controller of claim 4 wherein said responding means is operable in a mode in which a specified one of said peripheral units is accessed without judging whether or not IO data stored in said cache memory are used, IO data stored in said specified peripheral unit are obtained and a response is returned based on said obtained IO data.

9. A communication unit for a programmable controller, said programmable controller including peripheral units and an internal bus, said communication unit comprising:
a cache memory for recording IO data stored in said peripheral units, said cache memory being divided into partitions corresponding to said peripheral units, update check and IO refresh of said cache memory being executed in units of said divided partitions;
period judging means for judging whether or not a preliminarily set effective period has passed since the IO data of said peripheral unit were stored in said cache memory; and
responding means serving to create response data, when said communication unit has received a message, based on the IO data stored in said peripheral unit stored in said cache memory, if said period judging means judges that said effective period has not passed since said IO data were stored, and to access said peripheral unit, if said period judging means judges that said effective period has passed since said IO data were stored, to obtain said updated IO data and to create response data based on said obtained IO data.

* * * * *